United States Patent
Yankielun

Patent Number: 5,796,679
Date of Patent: Aug. 18, 1998

[54] DOPPLER VELOCIMETER FOR MONITORING GROUNDWATER FLOW

[75] Inventor: Norbert E. Yankielun, Lebanon, N.H.

[73] Assignee: The United States of America as represented by the Secretary of the Army, Washington, D.C.

[21] Appl. No.: 490,269

[22] Filed: Jun. 14, 1995

[51] Int. Cl.[6] .................. G01S 15/00; G01F 1/66; G01F 13/00

[52] U.S. Cl. .................. 367/99; 367/90; 73/861.26; 73/170.13; 73/861.18

[58] Field of Search .................. 367/87, 89, 90, 367/99, 107, 117, 118, 908, 121, 124; 73/861, 861.18, 861.25, 861.26, 861.85, 170.13, 155

[56] References Cited

U.S. PATENT DOCUMENTS

| | | |
|---|---|---|
| 3,379,060 | 4/1968 | Pear, Jr. .................. 73/170.13 |
| 4,391,137 | 7/1983 | Kerfoot et al. .................. 73/204 |
| 4,807,201 | 2/1989 | Fryda et al. .................. 367/99 |
| 5,265,477 | 11/1993 | Inferrera .................. 73/861.09 |

*Primary Examiner*—Ian J. Lobo
*Attorney, Agent, or Firm*—Luther A. Marsh

[57] ABSTRACT

Groundwater velocity and direction of flow are determined by insertion into a borehole below the water table of a sound source and a plurality of sound sensors. A periodic sound signal is emitted by the sound source, which is submerged in groundwater at the bottom of the borehole. The sound signals are sensed by the sound sensors, which are also submerged in the water in the vicinity of the sound source. Owing to the Doppler effect, there is a shift in the frequency of the sound signals observed by the different sound sensors. The differences in frequency are determined by pulse counters and used to compute the components of groundwater velocity along north-south and east-west axes. The velocity of groundwater flow and its direction are determined by vector addition of the groundwater velocity components. These computational processes are carried out by an appropriately programmed microprocessor.

16 Claims, 1 Drawing Sheet

DOPPLER VELOCIMETER FOR MONITORING GROUNDWATER FLOW

GOVERNMENT INTEREST STATEMENT

The invention described herein may be manufactured, licensed, and used by or for governmental purposes without the payment of any royalties thereon.

I. BACKGROUND OF THE INVENTION

1. Field of Invention

This invention relates to apparatus and a method for monitoring groundwater flow. More specifically, it relates to apparatus and a method for determining groundwater flow velocity and direction by using high-frequency acoustic signals and the frequency shift due to the Doppler effect.

2. Description of Prior Art

The most common currently employed down-borehole groundwater flow measurement techniques rely on radial thermal transport from a centralized, pulsed heat probe to a concentric array of sensors. This technique, which relies on the radial migration of a thermal pulse, tends to lose accuracy at very low flow rates due to thermal dispersion and vertical propagation of the heat pulse. In addition, the cross-sectional area of typical probes, requiring up to nine sensor array elements to determine both velocity and direction, may significantly disturb the flow pattern in a small borehole.

II. SUMMARY OF THE INVENTION

The object of the present invention is to provide apparatus and a method for determining the velocity and direction of groundwater flow at extremely low flow rates. This is accomplished, in accordance with the present invention, by insertion into a vertical borehole reaching the water table a sound generating source and a plurality of sound sensors, immersed in water at the same elevation as the sound source. The borehole typically has a steel casing, into which a plastic pipe (e.g., polyvinyl chloride) is inserted. At the end of the plastic pipe, which reaches slightly below the water table, there is a vertical cylindrical screen allowing groundwater flow to take place through the openings of the screen. The sound source and sound sensors are inserted via the plastic pipe and positioned in the groundwater in the screened extension of the pipe. The sound sensors are oriented with respect to the sound source in a predetermined manner. When two sound sensors are used, they may be arranged, for example, at the acute corners of a right isosceles triangle, with the sound source at the right-angle corner. Specifically, for example, they may be positioned exactly north and exactly east of the sound source. When four sound sensors are used, they may be positioned exactly north, east, south, and west of the sound source. Other reference directions may obviously be used.

A high-frequency electrical signal is generated by a signal generator and transmitted to the sound source in the borehole by interconnecting electrical wiring. A high-frequency sound signal is emitted by the sound source in the water as a result of the high-frequency electrical signal. This sound signal is propagated through the water at the speed of sound in water, about 1400 m/sec, and sensed by the sound sensors positioned a short distance from the sound source in the water in the borehole. The sound signals received by the sound sensors are converted to electrical impulses by the sound sensors and transmitted by electrical wiring to electrical amplification and pulse counting means at the surface.

When the groundwater is stationary, the frequency of the sound signal received by the sound sensors is exactly equal to the frequency of the sound signal emitted by the sound source. When the groundwater moves, the frequencies of the sound signals received by the sound sensors will differ slightly from the frequency of the emitted sound signal due to the Doppler effect. The difference in frequency between the emitted sound signals and the signals received by the sound sensors is mathematically related to the groundwater velocity, the speed of sound in water, and the frequency of the emitted sound signals. For a sound source and a sound sensor submerged in groundwater, according to the Doppler principle, the groundwater velocity component along an axis passing through the sound source and the sound sensor is $$\text{groundwater velocity} = \text{sonic velocity in water} \times \text{frequency difference}/(\text{emitted frequency} \times 2)$$

The difference in frequency between the emitted and received sound signals may be determined by pulse counters which count the number of pulses during a predetermined counting time. The above mathematical relationship then becomes $$\text{groundwater velocity} = \text{sonic velocity in water} \times \text{pulse count difference}/(\text{pulse count} \times 2)$$

A number of physical arrangements of sound sensors with respect to the sound source may be used to determine the groundwater velocity components along a north-south and an east-west axis. The direction and velocity of the groundwater flow is then obtained by vector addition of the north-south and the east-west velocity components.

When sound sensors are located on opposite sides of the sound source and pulse count differences between the sound sensors are determined, the groundwater velocity component is given by $$\text{groundwater velocity} = \text{sonic velocity in water} \times \text{pulse count difference}/\text{pulse count}$$

When groundwater velocity components along a north-south and an east-west axis have been determined, the direction of groundwater flow and its velocity are again determined by vector addition of the groundwater velocity components along the north-south and east-west axes.

III. BRIEF DESCRIPTION OF THE DRAWINGS

IV. DETAILED DESCRIPTION OF PREFERRED EMBODIMENTS

Into a vertical borehole reaching the water table, there is inserted a sound generating source and a plurality of sound sensors, immersed in groundwater at approximately the same elevation. The borehole has a steel casing, into which a plastic pipe is inserted. At the end of the plastic pipe, which reaches slightly below the water table, there is a vertical cylindrical screen allowing groundwater flow to take place through the openings of the screen. The sound source and sound sensors are inserted via the plastic pipe and positioned in the groundwater in the screened extension of the pipe. The sound sensors are oriented with respect to the sound source in a predetermined manner.

Figure 1:
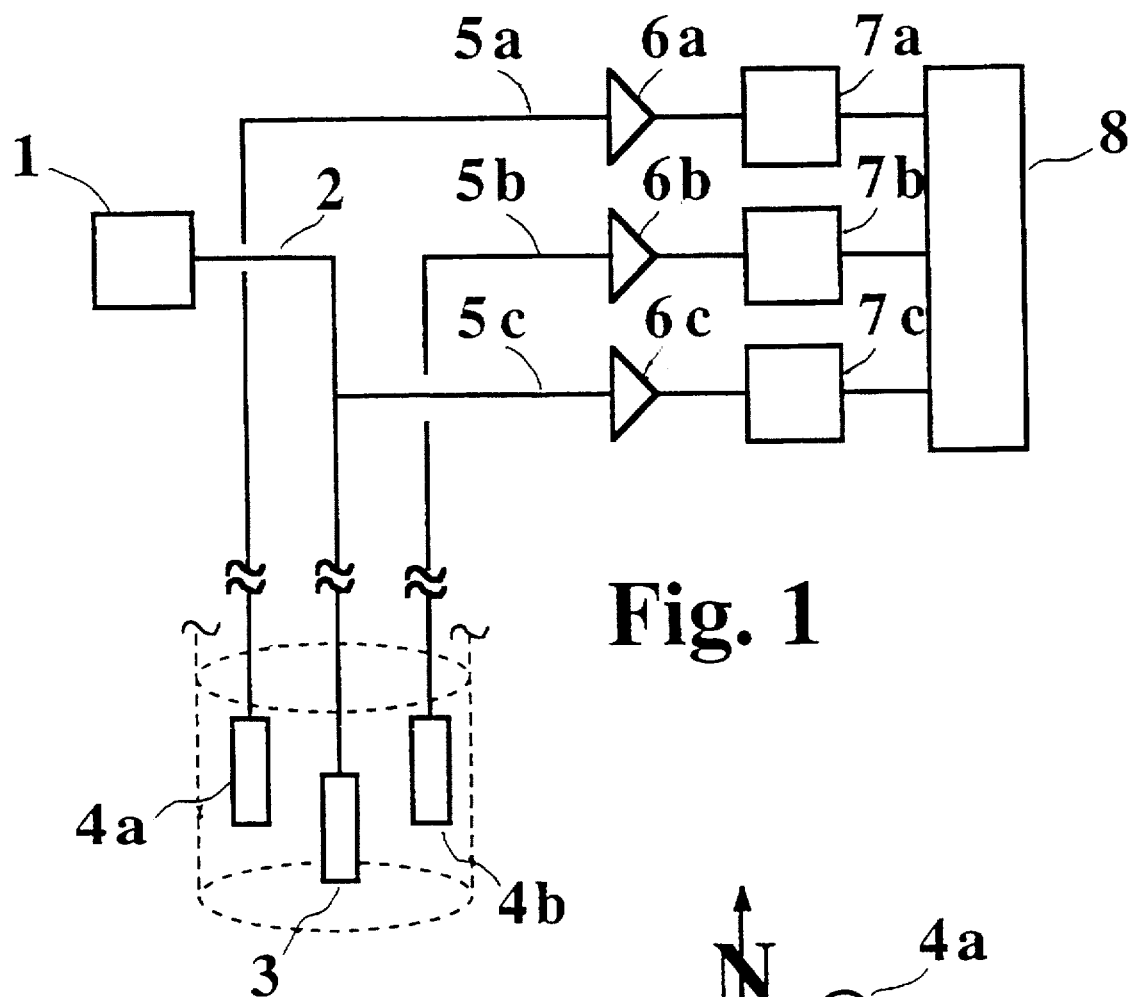
FIG. 1 shows a schematic view of a system for determining groundwater velocity and direction using two sound sensors and a sound source.
Figure 3:
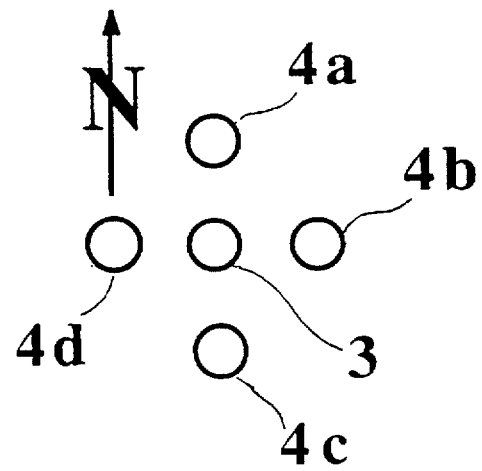
FIG. 3 shows a schematic plan view of the orientation of four sound sensors and a sound source.

With reference to FIG. 1, a high-frequency electrical signal source 1 generates electric periodic square waves, short square pulses, or sinusoidal signal and transmits these by wire 2 to a sound source 3, which is immersed in groundwater within a borehole as shown by dotted lines in FIG. 1. The periodic electrical signals are converted to periodic sound signals, which are emitted by the sound source, or sound transmitter, into the groundwater. Two sound sensors, or sound receivers, 4a and 4b also immersed in the groundwater receive the sound signals and convert them to electrical impulses that are transmitted to the surface by wires 5a and 5b.

Electrical impulses in wires 5a and 5b are transmitted to amplifiers 6a and 6b, where they are amplified and electronically processed as needed. Wire 5c, connected to wire 2, transmits an electrical impulse at the sound generator frequency to an amplifier 6c, where it is amplified and electronically processed as needed. The output signals of the three amplifiers 6a, 6b, and 6c are sent to three pulse counters 7a, 7b, and 7c. The pulse counts for a predetermined counting period are fed to a microprocessor 8, which performs the appropriate mathematical operations for converting the pulse counts to groundwater velocity and direction.

The frequency of the signal source ranges from about 100 KHz to about 100 MHz. The pulse counting time, for purposes of determining the Doppler shift frequency, ranges from 5 minutes to about 48 hours.

The acoustic sensor assembly is comprised of a sound transmitter transducer and the sound receiver transducers, which are permanently mounted in an appropriate geometric configuration with respect to each other, and the pipe whose outside diameter is slightly less than the inside diameter of the steel well casing into which it is inserted. This assembly is placed down the well casing into a screened section to a depth to completely submerge the assembly in ground water. Alignment of the assembly relative to a north-south axis or any other predetermined reference direction is performed manually from the surface. Present down-hole instrumentation employs a long rod solidly coupled to the sensor module having a known orientation relative to the sensor elements. This rod is rotated to the appropriate orientation from the surface. Other schemes for down-borehole sensor alignment incude the application of optical and electronic compass instrumentation mounted on a downhole sensor.

Piezoelectric transducers are used for the sound transmitter and receivers. The sound receivers typically have identical piezoelectric characteristics, although they may differ in characteristics for certain applications. The sound transmitter typically has piezoelectric characteristics different from those of the sound receivers, although these characteristics may be identical in some instances. The transducers typically are 3 cm in length and 3 mm in diameter and have a frequency response from zero to 100 MHz. Approximately 2 cm of the transducer length is exposed to the water, and about 1 cm is inside a watertight header housing inside which the transducers are connected to individual coaxial shielded cables. Signals are transmitted between the transducers and surface equipment via these cables. Alternatively, single or multiple optical fiber connections may be used with appropriate electronics interfaces at the sensor and surface instrumentation ends. Optical fiber transmission would have the advantage over wire transmission of being immune to interference from stray electromagnetic fields.

The source oscillator may be located at the surface or it may be incorporated into the down-hole sensor module. In the latter case, the relatively stable groundwater temperature would ensure stable oscillator frequency.

The pulse counters are 16-bit binary counters, capable of counting from 0 to 65,535 pulses and then rolling over to 0 and starting to count again. They are initially set to zero and the switched on to count pulses for a predetermined period of time. As time progresses, the receiver counters roll over at a rate determined by the shifted Doppler frequency of the received pulses. The relative difference between the individual counters is maintained. The counts are incremented and stored on a counter/clock oscillator board which is compatible with a personal computer. At appropriate intervals, software controlling a personal computer interrogates the counter board to obtain pulse count differences and computes the doppler frequency shift and the velocity and direction of groundwater flow.

EXAMPLE 1

Figure 2:
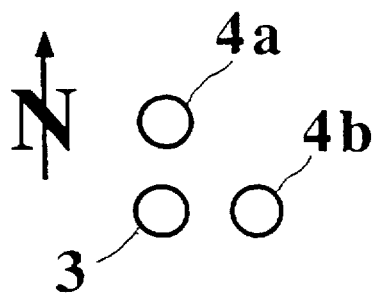
FIG. 2 shows a schematic plan view of the orientation of two sound sensors and a sound source.

Sound sensor 4a is positioned exactly north of sound source 3 as shown in FIG. 2. Sound sensor 4b is positioned exactly east of sound source 3. A square wave signal is generated by the electrical signal generator 1, having a frequency of 4 MHz. Pulses are counted by the three pulse counters 7a, 7b, and 7c for 24 hours. After 24 hours, the pulse counts are compared and it is observed that at the north receptor 4a, the pulse count is 1000 pulses greater than at the sound source 3, and the pulse count at the east receptor 4b is 500 pulses less than at the sound source 3. During the 24 hour counting period, $3.456 \times 10"$ pulses are counted at the sound source.

Using the Doppler principle, the north-south and east-west components of the groundwater velocity are calculated to be $$v \text{ north} = 1400 \text{ m/sec} \times 1000/(3.456 \times 10" \times 2) = 2.025 \times 10^{-6} \text{ m/sec}$$
$$= 17.5 \text{ cm/day}$$
$$v \text{ east} = 1400 \text{ m/sec} \times (-500)/(3.456 \times 10" \times 2) =$$
$$-1.0125 \times 10^{-6} \text{ m/sec}$$
$$= -8.75 \text{ cm/day}$$

The direction of the groundwater flow is $$arctan\ (-8.75/17.5) = North\ 26.6\ West$$

and the velocity is $$(17.5^2 + 8.75^2)^{1/2} = 19.6\ cm/day$$

EXAMPLE 2

Sound sensors 4a, 4b, 4c and 4d are positioned exactly north, east, south, and west of the sound source 3 in the groundwater at the bottom of the borehole. The sides of the square at whose corners the sound sensors are positions are at a 45° angle with the north-south and east-west directions. Pulses are counted at the four sound sensors, not at the sound source as in Example 1. Differences in pulse counts, north to south and east to west, are determined as described above.

The frequency of the sound signal emitted by the sound source is 10 MHz. The pulse counting period is 12 hours. After the 12-hour counting period, the pulse count difference, north-south, is −300 pulses, and the pulse count difference, east-west, is +400 pulses. The pulse count is $4.32 \times 10"$ pulses.

Using the Doppler principle, the north-south and east-west components of the groundwater velocity are calculated to be $$v\,\text{north} = 1400\,\text{m/sec} \times (-300)/(4.32 \times 10") = -0.972 \times 10^{-6}\,\text{m/sec}$$
$$= -8.4\,\text{cm/day}$$
$$v\,\text{east} = 1400\,\text{m/sec} \times 400/(4.32 \times 10") = -1.296 \times 10^{-6}\,\text{m/sec}$$
$$= +11.2\,\text{cm/day}$$

The direction of the groundwater flow is $$\arctan(11.2/(-8.4)) = \text{South } 53.1\text{ East}$$

and the groundwater velocity in this direction is $$(11.2^2 + 8.4^2)^{1/2} = 14.0\,\text{cm/day}$$

While this invention has been described in terms of a specific preferred embodiment, it is understood that it is capable of further modification and adaptation of the invention following in general the principle of the invention and including such departures from the present disclosure as come within the known or customary practice in the art to which the invention pertains and as may be applied to the central features set forth, and fall within the scope of the invention and of the limits of the appended claims.

What is claimed is:

1. Apparatus for determining the velocity and direction of groundwater flow comprising:

a generator of a periodic electrical signal connected to a sound source submerged in groundwater in a borehole;

a first sound sensor and a second sound sensor submerged in groundwater in the borehole and located at the acute corners of a right isosceles triangle, with the sound source being at the right-angle corner of the triangle;

three amplifiers receiving, respectively, their input signals from the generator of the periodic electrical signal and from the first and the second sound sensor;

three pulse counters receiving, respectively, their input signals from the three amplifiers;

programmable computing means receiving the corresponding output signals of the three pulse counters and capable of carrying out mathematical computation instructions to compute the velocity and direction of groundwater flow and to display the results of this computation.

2. Apparatus in accordance with claim 1 wherein the generator of periodic electrical signals emits a square wave.

3. Apparatus in accordance with claim 1 wherein the generator of periodic electrical signals emits short pulses.

4. Apparatus in accordance with claim 1 wherein the generator of periodic electrical signals emits a sinusoidal wave.

5. Apparatus in accordance with claim 1 wherein the generator of periodic electrical signals emits such signals at a frequency ranging from about 100 KHz to about 100 MHz.

6. Apparatus in accordance with claim 1 wherein the pulse counters count pulses for from about 5 minutes to about 48 hours.

7. Apparatus in accordance with claim 1 wherein two sides of the triangle which are at right angles to each other are aligned with any predetermined reference direction.

8. Apparatus in accordance with claim 7 wherein the two sides of the triangle which are at right angles to each other are aligned with the north-south and the east-west directions.

9. Apparatus for determining the velocity and direction of groundwater flow comprising:

a generator of a periodic electrical signal connected to a sound source submerged in groundwater in a borehole;

a first, second, third, and fourth sound sensor submerged in groundwater in the borehole and located at the corners of a square, with the sound source being at the center of the square;

four amplifiers receiving, respectively, their input signals from the first, second, third, and fourth sound sensors;

four pulse counters receiving, respectively, their input signals from the four amplifiers;

programmable computing means receiving the corresponding output signals of the four pulse counters and capable of carrying out mathematical computation instructions to compute the velocity and direction of groundwater flow and to display the results of this computation.

10. Apparatus in accordance with claim 9 wherein the sides of the square are aligned with any predetermined reference direction.

11. Apparatus in accordance with claim 10 wherein the sides of the square are aligned at a 45° angle with the north-south and the east-west directions.

12. Apparatus in accordance with claim 9 wherein the generator of periodic electrical signals emits a square wave.

13. Apparatus in accordance with claim 9 wherein the generator of periodic electrical signals emits short pulses.

14. Apparatus in accordance with claim 9 wherein the generator of periodic electrical signals emits a sinusoidal wave.

15. Apparatus in accordance with claim 9 wherein the generator of periodic electrical signals emits such signals at a frequency ranging from about 100 KHz to about 100 MHz.

16. Apparatus in accordance with claim 9 wherein the pulse counters count pulses for from about 5 minutes to about 48 hours.

* * * * *